United States Patent [19]

Amick

[11] 4,117,900

[45] Oct. 3, 1978

[54] WIND-POWERED CAR

[76] Inventor: James L. Amick, 1464 Cedar Bend Dr., Ann Arbor, Mich. 48105

[21] Appl. No.: 849,888

[22] Filed: Nov. 9, 1977

Related U.S. Application Data

[63] Continuation-in-part of Ser. No. 705,627, Jul. 15, 1976, abandoned, which is a continuation of Ser. No. 577,778, May 15, 1975, abandoned.

[51] Int. Cl.² ............................................. B62D 57/04
[52] U.S. Cl. ..................................... 180/7 R; 244/218; 296/1 S
[58] Field of Search ....................... 180/1 FV, 2, 7 R; 244/2, 218; 280/213; 296/1 S, 91

[56] References Cited

U.S. PATENT DOCUMENTS

| | | | |
|---|---|---|---|
| 1,653,903 | 12/1927 | Hall | 244/218 |
| 2,893,661 | 7/1959 | Aylor | 244/2 |
| 2,940,688 | 6/1960 | Bland | 244/2 |
| 3,804,428 | 4/1974 | Amick | 280/8 |

*Primary Examiner*—Joseph F. Peters, Jr.
*Assistant Examiner*—R. Schrecengost
*Attorney, Agent, or Firm*—Olsen and Stephenson

[57] ABSTRACT

A passenger car deriving all or a part of its motive power from the wind through a system of one or more rigid vertical airfoils symmetrically aligned with respect to the fore-and-aft axis of the car. The relative wind velocity acting on the airfoil system under typical conditions produces a force tending to propel the car forward. The production of this sailing force occurs automatically, without requiring any adjustment of the airfoil system. The sailing force can be increased by having a tall airfoil system, which retracts to a lesser height for convenience in garaging or for safety in high winds. The wind-derived sailing force can significantly improve the fuel economy of a car using this invention, and in some applications of the invention, it can enable the car to cruise at a respectable speed in average wind conditions on wind power alone. When the car is traveling at speeds less than the maximum speed obtainable from the existing wind conditions, the excess wind power can be used to charge an energy storage device, from which energy can later be withdrawn as required to propel the car in periods of insufficient wind or when greater acceleration is desired.

16 Claims, 12 Drawing Figures

U.S. Patent Oct. 3, 1978 Sheet 1 of 3 4,117,900
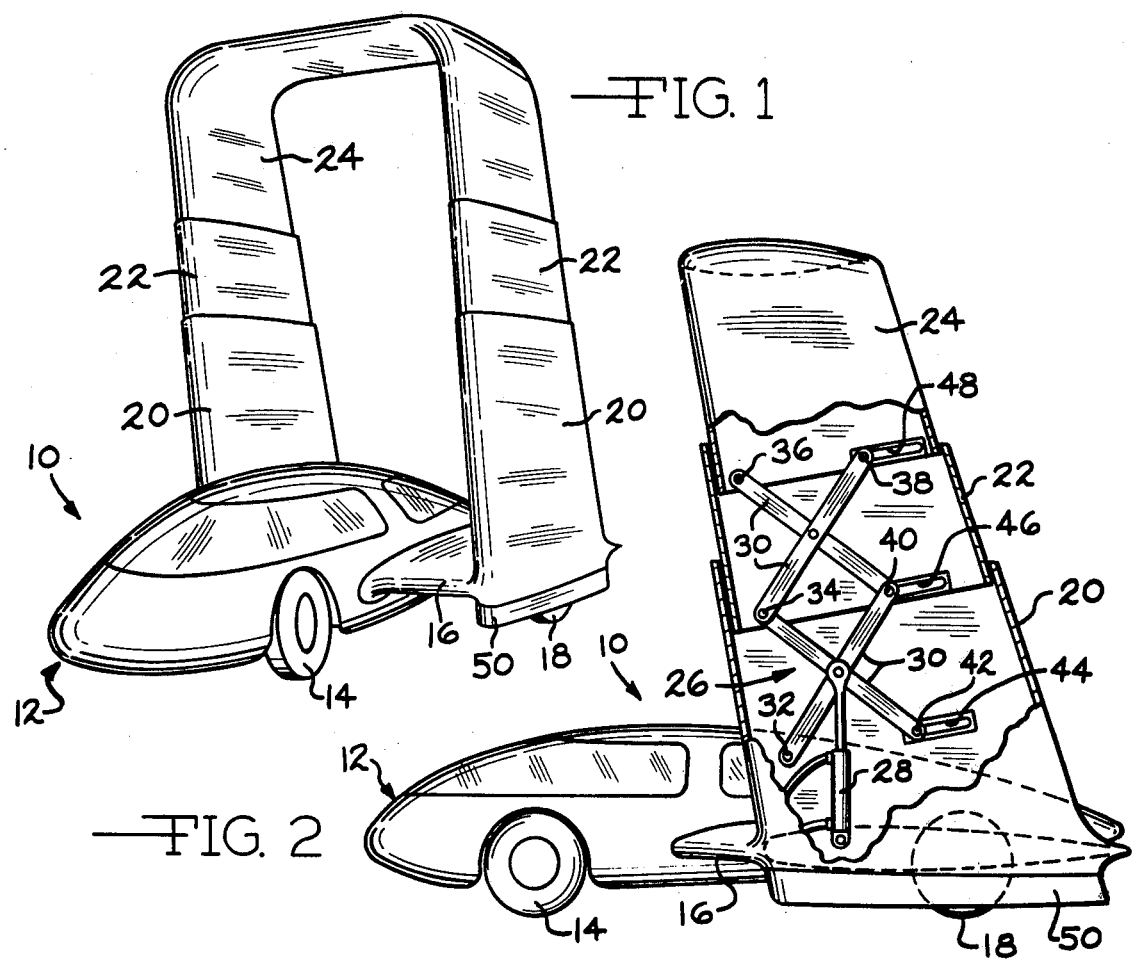
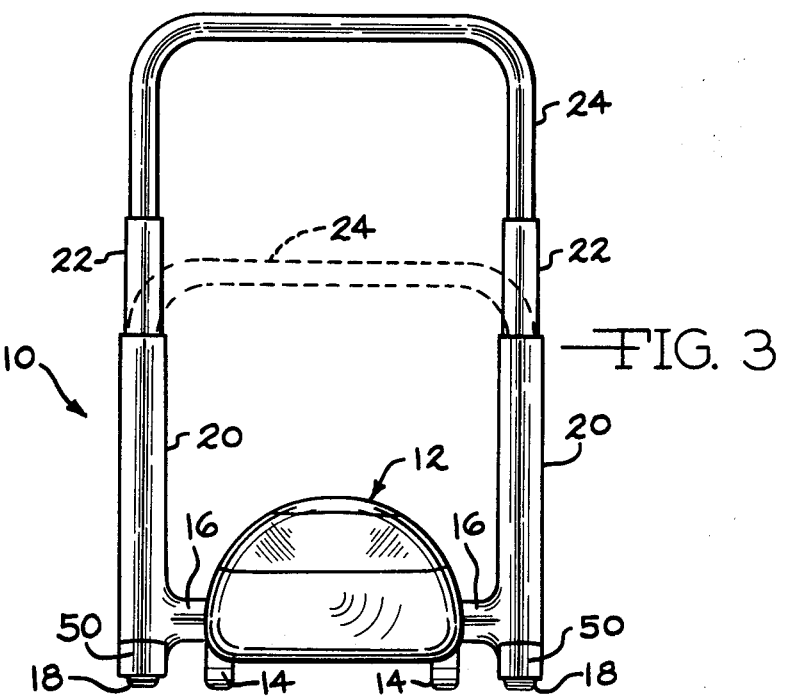

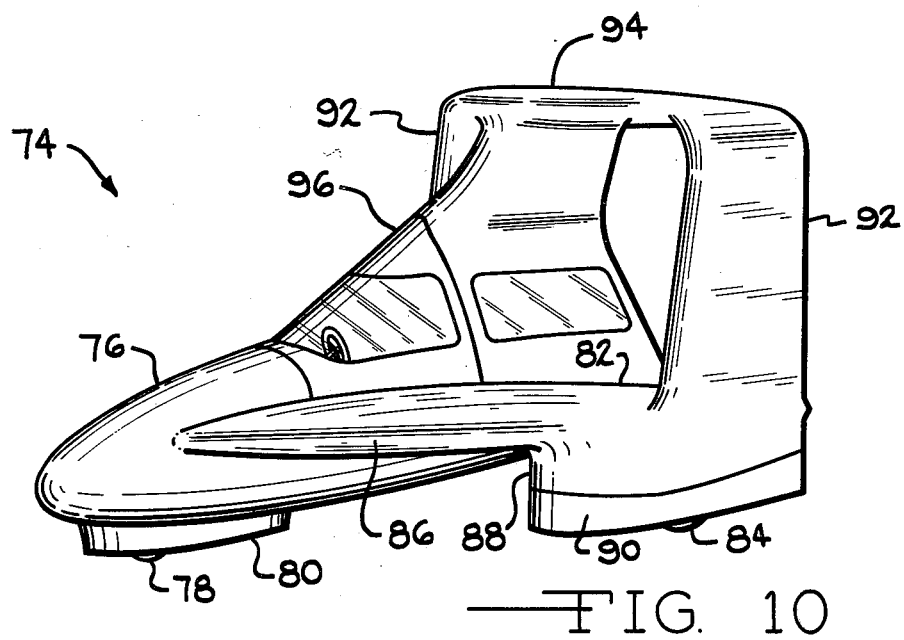
FIG. 10
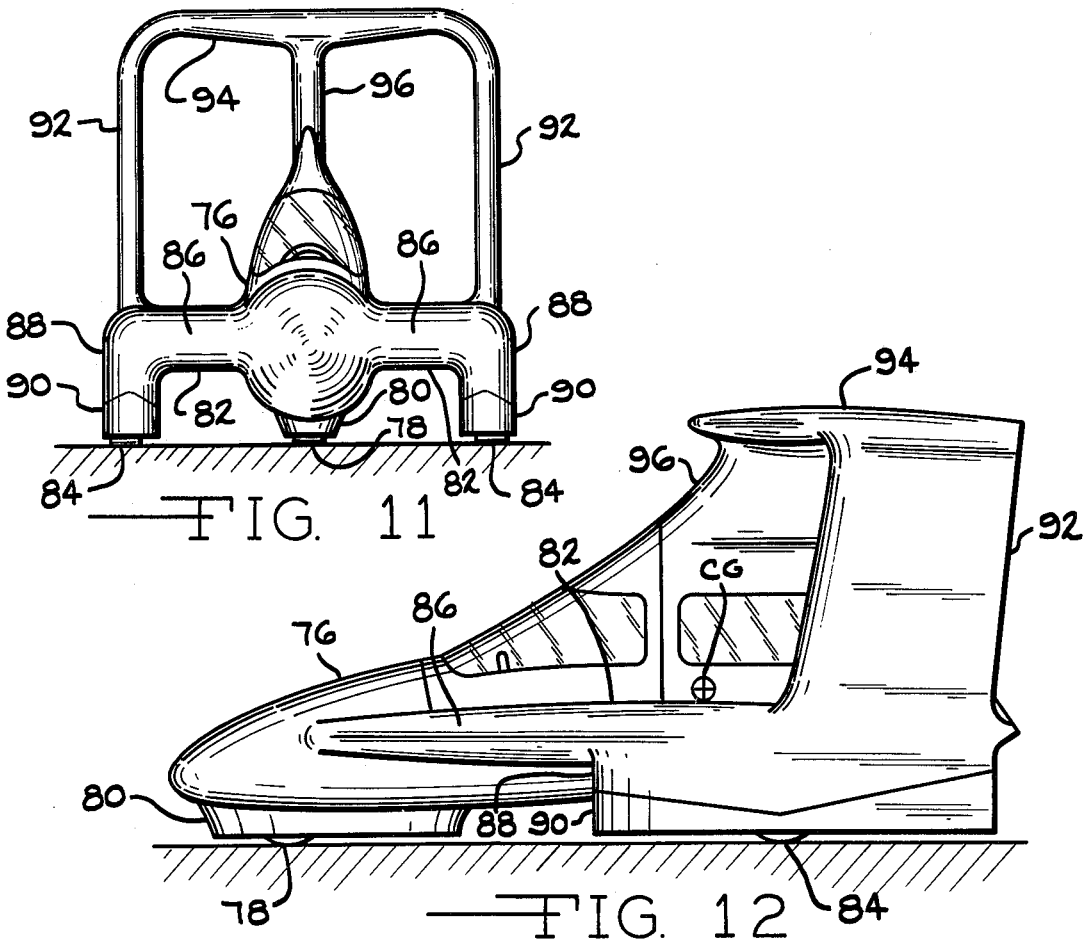
FIG. 11
FIG. 12

WIND-POWERED CAR

REFERENCE TO PENDING APPLICATIONS

This application is a continuation-in-part of pending application Ser. No. 705,627, filed July 15, 1976, and now abandoned, which was a streamlined continuation of application Ser. No. 577,778, filed May 15, 1975 and now abandoned, both in the name of James L. Amick for "Wind-Powered Car."

BACKGROUND OF THE INVENTION

The present invention relates to self propelled vehicles which are adapted to utilize wind power as a second source of energy for propulsion purposes.

The modern automobile, which is the main transportation device in our society, provides a vehicle that is relatively easy to operate, but one which is rapidly depleting the available petroleum energy sources of the world. Thus, there is a growing need for energy conserving transportation devices. The landsailer is a prime example of such a device, requiring only wind for its propulsion. A device such as this is disclosed in U.S. Pat. No. 3,804,428, issued Apr. 16, 1974, to Amick. However, present landsailers of this character are unsuitable for general transportation use, becuase they require a favorable wind to move in a given direction, and require sailing skill for their operation. To overcome the inadequacies of the modern automobile and the landsailer, it would be desirable to combine their good features. But merely adding a conventional sail to the top of an automobile would not be very satisfactory. The sail would need to be trimmed for various wind conditions, it would tend to flap when the relative wind approached from straight ahead, and its efficiency would be less than that which can be obtained from rigid airfoils.

The rigid airfoil landsailer described in U.S. Pat. No. 3,804,428 could be used as a wind powered highway car, if fitted with an auxiliary propulsion means. However, it would still require sailing skill from the driver in adjusting the angle of attack of the airfoil system by means of the yaw control.

Thus, merely combining the features of a modern automobile with those of a landsailer would still fail to meet the needs for an energy conversing transportation device that provides ease of operation.

SUMMARY OF THE INVENTION

The present invention has overcome the inadequacies of the prior art so as to provide a vehicle adapted for general transportation purposes, and which provides both ease of operation and energy conservation. The basis of the present invention is the thesis that a rigid vertical airfoil (or system of airfoils) symmetrically aligned with the axis of a car can generate almost as much forward propelling force from a given wind as if it were rotated to an optimum angle of attack, over the range of wind and vehicle speeds of greatest practical importance. This principle greatly simplifies the construction and operation of a wind-powered car. Thus, the rigid-airfoil landsailer of U.S. Pat. No. 3,804,428 could be converted to a wind-powered car suitable for highway use by installing an auxiliary propulsion means, with simplified construction using non-steerable main wheels which require no adjustments in operation.

In one form, the invention consists of a streamlined body supported in the front by two steerable wheels and in the rear by two horizontal struts extending outward from each side of the body to two rear wheels (non-steerable), above which extend fixed vertical airfoils aligned symmetrically with the vehicle fore-and-aft axis. A retractable portion above the fixed vertical airfoils extends the airfoils higher and connects them together, the whole forming an arch-shaped wing. The rear wheels are connected to a motor supplied with electricity from an energy storage device.

In another form, the invention consists of a streamlined body supported in the front by a single steerable wheel and in the rear by two horizontal struts extending outward from each side of the body to two rear wheels (non-steerable), above which extend fixed vertical airfoils aligned symmetrically with the vertical fore-and-aft axis. A horizontal airfoil connects the tops of the outer vertical airfoils and the top of a center vertical airfoil arising from the body. The rear wheels are connected to electric motors supplied with electricity from an energy storage device.

In either of the above two forms of the invention, the driver operates an accelerator pedal which controls the flow of electricity from the energy storage device to the wheel-connected motors. Acceleration to cruising speed is normally accomplished using the stored energy. In average wind conditions, aerodynamic forces on the vertical airfoils are sufficient to maintain a respectable cruising speed. In the absence of sufficient wind, the desired vehicle speed can be maintained by assistance from the stored energy supply acting through the motors to drive the rear wheels.

When a reduction in vehicle speed is desired, the driving depresses a retarder pedal which first connects the motors as generators to recharge the energy storage device with power extracted from the rear wheels. Increased depression of the retarder pedal increases the deceleration of the vehicle by increasing the recharging rate. Further movement of the retarder pedal activates conventional wheel brakes which cause increased deceleration as required.

This system for controlling the vehicle acceleration or deceleration by discharging or recharging batteries or other energy storage devices is not in itself unique to this invention, but rather, partakes of the available technology of speed control and regeneration braking developed for electric vehicles and other vehicles operated on stored energy. The present invention makes additional use of the regenerative braking feature to recharge the energy storage device from the excess forward thrust produced by wind action on the vehicle airfoil system.

With this invention, the process of extracting power from the wind to propel the vehicle and to recharge the energy storage device is completely automatic. No adjustments of the airfoil system are required, except in the one form of the invention when strong winds necessitate lowering the retractable upper airfoil portion. This simplicity of operation is quite different from other sailing vehicles, which require skill in positioning the sails. The driver of this invention merely presses one pedal to go faster, and the other pedal to go slower.

Under normal wind and driving conditions wind power keeps the energy storage device in a satisfactory state of change. However, under certain conditions the energy supply can become depleted, and then the drive must choose from these four options:
1. reduce speed,
2. wait for a better wind, 3. drive in a more favorable direction with respect to the existing wind, or 4. stop and recharge from an electric power outlet.

Accordingly, it is an object of the present invention to provide a wind-powered car having unlimited range and useful top speed capability in average wind conditions, and requiring no sailing skill.

Another object is to provide a wind-assisted car that conserves fuel energy by using wind power to supply a portion of the required propelling force, without requiring any attention from the driver.

Other objects of this invention will appear in the following description and appended claims, reference being had to the accompanying drawings forming a part of this specification wherein like reference characters designate corresponding parts in the several views.

BRIEF DESCRIPTION OF THE DRAWINGS

FIG. 1 is a perspective view of one embodiment of the invention;

FIG. 2 is a side elevational view partially in section of the embodiment in FIG. 1;

FIG. 3 is a front elevational view of the embodiemnt of FIG. 1, showing in broken lines the retracted position of the upper portion of the airfoil system;

FIG. 10 is a perspective view of still another embodiment of the invention;

FIG. 11 is a front elevational view of the embodiment of FIG. 10; and

FIG. 12 is a side elevational view of the embodiment of FIG. 10.

DESCRIPTION OF THE PREFERRED EMBODIMENTS

Figure 5:
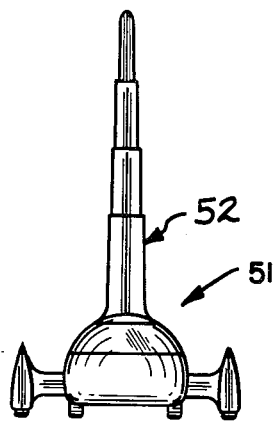
FIG. 5 is a front elevational view of the embodiment of FIG. 4.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

The wind-powered vehicle 10 has a streamlined body 12 housing an energy storage device, a motor-generator unit, and accommodations for passengers (not shown). Steerable front wheels 14 are mounted near the widest part of the body 12 for maximum stability. The outer sides of wheels 14 are flush with the sides of body 12 to minimize wind resistance.

The rear of the body 12 is supported by horizontal streamline struts 16 which extend laterally outward to non-steerable rear wheels 18. The rear wheels 18 are operatively connected to the conventional motor (not shown) and form therewith an alternate propulsion means in the body 12 for supplementing the propelling force of the airfoil system to be described. Lower airfoil sections 20 enclose wheels 18 and extend vertically upward to telescoping upper airfoil sections 22 and 24. Retracting mechanism 26, FIG. 2, retracts airfoil sections 22 and 24 into lower airfoil sections 20 as shown by dashed lines in FIG. 3, for convenience in garaging and for safety in high winds.

Identical retracting mechanisms 26 are installed in the left and right vertical airfoils. Each mechanism 26 consists of a hydraulic actuator 28 which extends or retracts a parallelogram linkage made up of four crossed bars 30. Pivot pins 32, 34 and 36 are fixed to airfoil sections 20, 22 and 24, respectively. Pivot pins 38, 40 and 42 slide in slots 44, 46 and 48 fixed to airfoil sections 20, 22 and 24, respectively. In operation, equal volumes of hydraulic fluid are supplied to the actuators 28 on the left and right sides of the vehicle, so that both sides retract or extend simultaneously.

The uppermost airfoil portion 24 contains a horizontal portion which serves as a partial endplate, diminishing the tip losses of the vertical airfoils. The horizontal portion also serves as a structural brace between the two vertical airfoils. The wide lateral spacing of the vertical airfoils minimizes induced drag, because each wing tip is relatively far from the opposite wing.

The lower airfoil sections 20 have at their lower end flexible skirts 50 made of rubber or similar elastomeric material which serve the purpose of extending the airfoil shape as close as possible to the ground in order to minimize gap losses. The bottom edges of the skirts 50 are stiffened by wire or other material to enable them to retain their airfoil shape. When large bumps in the road surface are encountered the skirts 50 merely deflect upward momentarily.

The airfoil system 20, 22 and 24 preferably is swept forward as shown in FIG. 2 to minimize the longitudinal distance between the aerodynamic center of pressure and the center of gravity, while covering the rear wheels with the lower airfoil sections 20.

All parts of the vehicle have lateral symmetry about a vertical plane through the fore-and-aft axis of the body.

As previously indicated, the rear wheels 18 are part of the alternate propulsion means and are driven by one or more motor-generator units (not shown) supplied with electricity from an energy storage device (not shown). A controller unit (not shown) with accelerator and retarder pedals gives the driver control over the rate of energy flow from the energy storage device to the wheels or vice versa.

Alternatively, the vehicle may be powered by a conventional engine (not shown) with the forward forces developed by cross wind action on the airfoil system serving to increase the fuel economy. In this case, the tall airfoil configuration of FIGS. 1-3 may not be necessary, and a non-retracting airfoil system similar to the retracted position of FIG. 3 may be sufficient.

Several other basic embodiments are conceivable within the scope of this invention. An embodiment with single front wheel and non-retractable airfoil results when the landsailer of U.S. Pat. No. 3,804,428 is modified by making the rear wheels non-steerable and adding auxiliary power. Other embodiments of the invention are shown in FIGS. 4-8.

Figure 4:
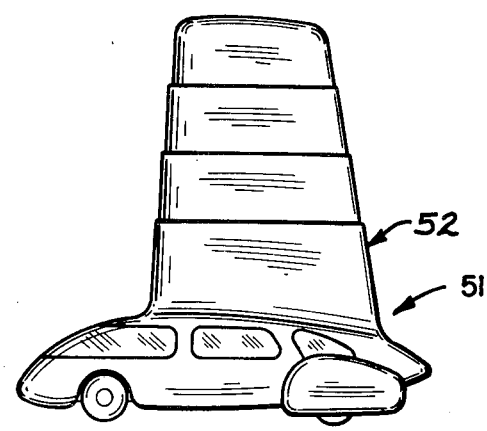
FIG. 4 is a side elevational view of another embodiment using a single vertical airfoil.

A wind-powered vehicle 51 using an airfoil system having a single vertical airfoil 52 is shown in FIGS. 4 and 5. This embodiment sacrifices some aerodynamic efficiency to obtain better side visibility, and a single airfoil retracting mechanism, similar to that shown at reference number 26, may be utilized for retracting and extending the airfoil system.

Figure 7:
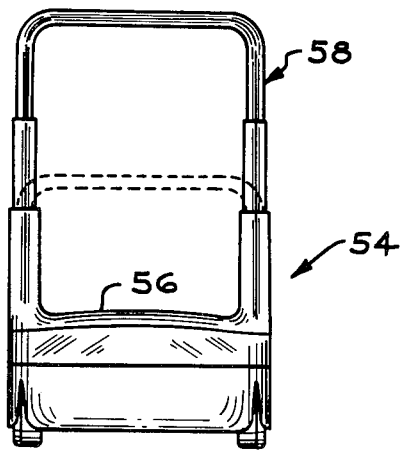
FIG. 7 is a front elevational view of the embodiment of FIG. 6.
Figure 6:
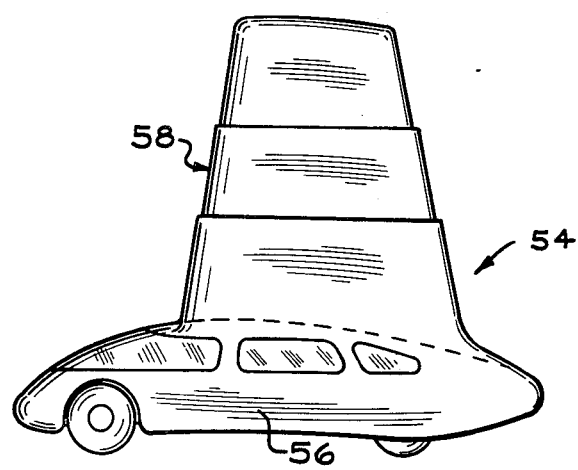
FIG. 6 is a side elevational view of another embodiment wherein the passenger compartment occupies the full width of the car.

Another embodiment of wind-powered vehicle 54 which sacrifices some wind power is shown in FIGS. 6 and 7. Here the advantage of a large passenger compartment within the body 56 is paid for by greater aerodynamic drag, which reduces the net available wind power. In other respects, this form of the invention is similar to the embodiment of FIGS. 1–3 in utilizing an inverted U-shaped airfoil 58.

Figure 9:
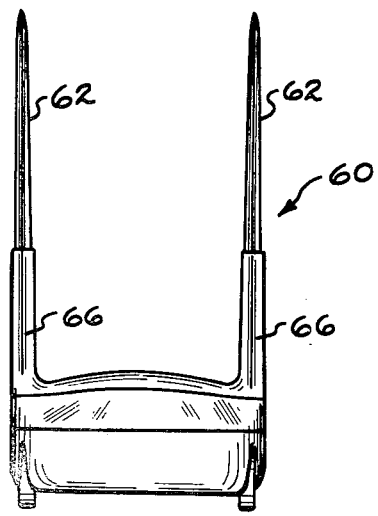
FIG. 9 is a front elevational view of the embodiment of FIG. 8.
Figure 8:
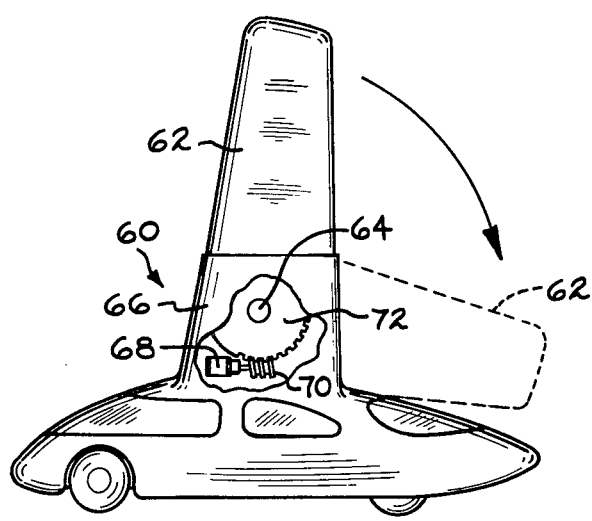
FIG. 8 is a side elevational view partially in section of another embodiment wherein the upper portion of the airfoil system rotates about a pivot to retract into the position shown by broken lines.

Still another embodiment retaining the large passenger compartment of a conventional automobile is shown in FIGS. 8 and 9. In this form of the wind-powered vehicle 60, the upper airfoil sections 62 are retracted by rotating about pivots 64 in the lower airfoil sections 66. The upper rear portions of lower airfoil sections 66 are made of thin springy material such as sheet metal, so that they can spread apart to accommodate the maximum thickness of the upper airfoil sections 62 in the retracted position. Retraction is accomplished by motors 68 driving worm gears 70 which engage gear sectors 72 rigidly attached to upper airfoil sections 62, thus rotating upper airfoil sections 62 about pivots 64.

Attention is directed next to FIGS. 10, 11 and 12 for a description of still another embodiment of the invention. The wind-powered vehicle 74 has a streamline body 76 housing an energy storage device, motors, and accommodations for passengers (not shown). Steerable front wheel 78 is housed within a flexible fairing 80 for maximum streamlining.

Horizontal streamline struts 82 extend laterally outward from the body to non-steerable rear wheels 84. The struts 82 have their leading edges 86 swept rearward, beginning near the nose of the body and extending outward and back. This safety feature causes the vehicle to deflect, or be deflected from, other objects, in collisions. Thus, the narrow nose and swept leading edges cause most frontal collisions to become glancing ones. The swept leading edges of the struts also protect the driver from side collisions.

The rear wheels 84 are operatively connected to the conventional electric motors (not shown) and form therewith an alternate propulsion means in the vehicle for supplementing the propelling force of the airfoil system to be described. The rear wheels are housed within lower airfoil portions 88 which extend downward from the horizontal struts 82. The lower airfoil portions 88 have at their lower ends flexible skirts 90 made of rubber or other flexible material which serve the purpose of extending the airfoil shape as close as possible to the ground in order to minimize gap losses. The bottom edges of the skirts 90 are stiffened by wire or other material to enable them to retain their airfoil shape. When large bumps in the road surface are encountered, the skirts 90 merely deflect upward momentarily.

Outer airfoils 92 extend vertically upward from the outer extremities of horizontal struts 82. At their tops they blend into horizontal airfoil 94, which acts as en endplate, diminishing the tip losses of the vertical airfoils. A center vertical airfoil 96 arises from the body 76 essentially in a vertical plane containing the longitudinal axis of the vehicle 74 and terminates at the horizontal airfoil. This airfoil system of three vertical airfoils topped with a horizontal airfoil provides a rigid structural unit which protects the occupants of the vehicle in case of roll-over, in addition to its main function of supplying a propulsive aerodynamic force. The wide lateral spacing of the two outer airfoils 92 minimizes induced drag, because each wing tip is relatively far from the other airfoils.

The area distribution and location of the vertical airfoils 88, 92, and 96 are arranged so that the longitudinal position of the aerodynamic center of pressure is relatively close to that of the center of gravity CG of the vehicle, so that wind gusts will have minimal effect on steering. By placing part of the center airfoil 96 ahead of the center of gravity CG, the outer airfoils 92 can be located behind CG, at the extreme rear of the vehicle where they cause only minimal interference with the driver's field of vision.

All parts of the vehicle have lateral symmetry about a vertical plane through the fore-and-aft axis of the body.

As previously indicated, the rear wheels 84 are part of the alternate propulsion means and are driven by motors (not shown). A controller unit with accelerator and retarder pedals gives the driver control over the rate of energy flow from the energy storage device to the wheels or vice versa.

It is claimed:

1. A wind- and motor-powered land vehicle with a fore-and-aft longitudinal axis comprising a body supported by wheels, at least one of said wheels fixed to rotate in a plane parallel to the fore-and-aft axis of said vehicle, an airfoil system comprised of at least one vertically extending airfoil rigidly mounted on said body and topped with a laterally extending airfoil in an arrangement having bilateral symmetry about a vertical plane through said fore-and-aft axis, said airfoil system providing a forward propelling force to said vehicle when the airfoil system is subjected to certain cross-wind conditions, said airfoil system including a retracting mechanism for raising and lowering said laterally extending airfoil when desired, and self-contained motor propulsion means on said vehicle for providing acceleration from a stationary position and for propelling the vehicle either independently or in combination with propelling forces generated by wind action on said airfoil system.

2. The wind-powered vehicle that is defined in claim 1, wherein said airfoil system includes two generally upright airfoils rigidly mounted on said body on opposite sides of said vertical plane.

3. The vehicle that is defined in claim 2, wherein each of said upright airfoils includes a plurality of sections and said retracting mechanism comprises a plurality of linkages interconnecting said sections, and an actuator means operatively connected between said body and to said linkages for lowering and extending each said airfoil.

4. A wind- and motor-powered land vehicle with a fore-and-aft longitudinal axis comprising a body supported by wheels, at least one of said wheels fixed to rotate in a plane parallel to the fore-and-aft axis of said vehicle, an airfoil system comprised of two vertically extending airfoils rigidly mounted on said body in an arrangement having bilateral symmetry about a vertical plane through said fore-and-aft axis, said airfoil system providing a forward propelling force of said vehicle when the airfoil system is subjected to certain cross wind conditions, and self-contained motor propulsion means on said vehicle for providing acceleration from a stationary position and for propelling the vehicle either independently or in combination with propelling forces generated by wind action on said airfoil system, each airfoil having a plurality of airfoil sections telescopically fitted together, the lower airfoil section being rigidly mounted in fixed relationship to said body, said airfoil system including a retracting mechanism for lowering upper airfoil sections of said airfoil system when desired and for subsequently extending said airfoil system, said retracting mechanism including a plurality of linkages interconnecting said sections and an actuator means operatively connected between said body and to said linkages for lowering and extending each airfoil, and an intermediate airfoil extending between the upper sections of each of said airfoils so as to provide an inverted U-shaped airfoil.

5. The wind-powered vehicle that is defined in claim 4, wherein said body includes horizontal streamlined struts extending laterally outwardly and the lower section of each of said airfoils is mounted respectively on the outer extremity of each strut.

6. The vehicle that is defined in claim 4, wherein said body has sidewalls and the lower section of each of said airfoils is an upward extension respectively of each side wall of the body.

7. A wind-powered vehicle with a fore-and-aft axis comprising a body, wheels supporting said body, at least one of said wheels constrained to rotate in a plane parallel to the fore-and-aft axis of said vehicle, an airfoil system of at least one airfoil rigidly mounted on said body in an arrangement having bilateral symmetry about a vertical plane through said fore-and-aft axis, said airfoil system providing a forward propelling force to said vehicle when the airfoil system is subjected to certain wind conditions, and self-contained alternate propulsion means in said body for supplementing the propelling force of the airfoil system so as to provide greater vehicle speed or acceleration that can sometimes be delivered by said airfoil system, said airfoil system including retracting mechanism for lowering said airfoil system when desired and for subsequently extending said airfoil system, each airfoil of said airfoil system including a plurality of sections, the lowermost section being rigidly mounted on said body and the next-upward section being pivotally mounted for pivotal movement between a first upright position forming an extension of the lowermost section and a second horizontal position extending rearwardly generally at a right angle to the lowermost section.

8. The wind-powered vehicle that is defined in claim 7, wherein said retracting mechanism includes a gear train disposed between the pivotally interconnected sections and motor means for actuating said gear train for moving said next-upper section between its first and second position.

9. A land vehicle provided with both a wind-powered propulsion system and a self-contained propulsion system, said vehicle comprising a body having a fore-and-aft longitudinal axis with bilateral symmetry about a vertical plane through said fore-and-aft axis, front and rear wheels supporting said body, at least one of said wheels fixed to rotate in a plane parallel to said fore-and-aft axis, an airfoil system including at least one substantially vertical airfoil having a portion of its leading edge forward of the longitudinal center of the vehicle thereby to counteract yawing moments produced by airfoil portions behind the longitudinal center of the vehicle, said airfoil system being mounted in fixed relationship with respect to said longitudinal vehicle axis whereby to provide a forward propelling force to said vehicle when the airfoil system is subjected to certain cross-wind conditions, and self-contained propulsion means on said vehicle for providing acceleration from a stationary position and for propelling the vehicle either independently or in combination with propelling forces generated by wind action on said airfoil system.

10. A wind- and motor-powered land vehicle with a fore-and-aft longitudinal axis comprising a body supported by wheels, at least one of said wheels fixed to rotate in a plane parallel to the fore-and-aft axis of said vehicle, an airfoil system including two vertically extending airfoils rigidly mounted on said body in an arrangement having bilateral symmetry about a vertical plane through said fore-and-aft axis, said airfoil system providing a forward propelling force to said vehicle when the airfoil system is subjected to certain cross-wind conditions, and self-contained motor propulsion means on said vehicle for providing acceleration from a stationary position and for propelling the vehicle either independently or in combination with propelling forces generated by wind action on said airfoil system, each airfoil having a plurality of airfoil sections fitted together for relative vertical movement, the lower airfoil section being rigidly mounted in fixed relationship to said body, said airfoil system including a retracting mechanism for lowering upper airfoil sections of said airfoil system when desired and for subsequently extending said airfoil system, and an intermediate airfoil extending between the upper sections of each of said airfoils so as to provide an inverted U-shaped airfoil.

11. A land vehicle provided with both a wind-powered propulsion system and a self-contained propulsion system, said vehicle comprising a body having a fore-and-aft longitudinal axis with bilateral symmetry about a vertical plane through said fore-and-aft axis, front and rear wheels supporting said body, at least one of said wheels fixed to rotate in a plane parallel to said fore-and-aft axis, an airfoil system including at least one substantially vertical airfoil having a portion of its leading edge forward of the center of gravity of the vehicle thereby to counteract yawing moments produced by airfoil portions behind the center of gravity of the vehicle, said airfoil system being mounted in fixed relationship with respect to said longitudinal vehicle axis whereby to provide a forward propelling force of said vehicle when the airfoil system is subjected to certain wind conditions, and self-contained propulsion means on said vehicle for providing acceleration from a stationary position and for propelling the vehicle either independently or in combination with propelling forces generated by wind action on said airfoil system.

12. The land vehicle that is defined in claim 11, wherein said airfoil system includes at least three substantially vertical airfoils, said one airfoil being located essentially in a vertical plane containing the longitudinal axis of the vehicle, and the other two vertical airfoils being located at generally parallel relation to said one airfoil on opposite sides thereof rearwardly of the center of gravity of the vehicle.

13. The land vehicle that is defined in claim 12, wherein said airfoil system includes a horizontal airfoil connected to the top of said three airfoils.

14. The land vehicle that is defined in claim 11, wherein said wheels include a steerable front wheel located essentially in a vertical plane containing said fore-and-aft axis, and nonsteerable rear wheels fixed to rotate in planes on opposite sides of and parallel to said fore-and-aft axis.

15. The land vehicle that is defined in claim 14, wherein horizontal streamlined struts extend laterally outward from positions adjacent to said front wheel to positions adjacent to said rear wheels.

16. The land vehicle that is defined in claim 15, which includes a streamlined body having a nose enclosing said front wheel and from which leading edges of said struts are swept rearward.

* * * * *